United States Patent [19]
Feinbloom

[11] Patent Number: 5,652,636
[45] Date of Patent: Jul. 29, 1997

[54] LOCKING FLIP-UP TELESCOPIC LENS ASSEMBLY

[75] Inventor: Richard E. Feinbloom, New York, N.Y.

[73] Assignee: Designs For Vision, Inc., Ronkonkoma, N.Y.

[21] Appl. No.: 635,053

[22] Filed: Apr. 19, 1996

Related U.S. Application Data

[63] Continuation of Ser. No. 342,766, Nov. 21, 1994, abandoned.

[51] Int. Cl.⁶ .................................. G02C 7/08; G02C 1/00
[52] U.S. Cl. ................................... 351/58; 351/57; 351/158
[58] Field of Search ........................... 351/158, 58, 59, 351/63, 57, 47, 41, 205, 227; 359/411, 409, 368, 374, 399, 815, 822

[56] References Cited

U.S. PATENT DOCUMENTS

| | | | |
|---|---|---|---|
| D. 296,337 | 6/1988 | Caplan | D16/133 |
| 2,459,021 | 1/1949 | Frommer | 351/59 |
| 3,990,788 | 11/1976 | Choy | 351/59 |
| 4,534,627 | 8/1985 | Vosper | 351/47 |
| 4,740,069 | 4/1988 | Baum | 351/57 |
| 4,929,075 | 5/1990 | Eliakim | 351/158 |
| 5,076,682 | 12/1991 | Pasfield | 351/41 |
| 5,381,263 | 1/1995 | Nowak et al. | 351/158 |
| 5,541,767 | 7/1996 | Murphy et al. | 359/399 |

*Primary Examiner*—Hung X. Dang
*Attorney, Agent, or Firm*—Plevy & Associates

[57] ABSTRACT

An optical spectacle device comprising a spectacle frame having a pair of optical lenses. The spectacle device further includes a telescopic lens assembly pivotally attached to the spectacle frame which is pivotable between an operative position and a non-operative position. The spectacle device also includes an indexing mechanism for repeatedly orienting the telescopic lens assembly into the operative position from the non-operative position. A support frame for holding the telescopes of the telescopic lens assembly is adapted to be substantially out of a user's forward line of sight when the telescopic lens assembly is in the operative position.

18 Claims, 4 Drawing Sheets

LOCKING FLIP-UP TELESCOPIC LENS ASSEMBLY

This is a continuation of application Ser. No. 08/342,766, filed on Nov. 21, 1994, now abandoned entitled *LOCKING FLIP-UP TELESCOPIC LENS ASSEMBLY.*

RELATED APPLICATIONS

The assignee herein, Designs for Vision, Inc., is the record owner of U.S. patent application entitled "BIOPTIC TELESCOPE SYSTEM FOR USE WITH BIFOCAL SPECTACLES". Ser. No. 08/330,266, filed on Oct. 27, 1994 for Peter J. Murphy et al, which issued as U.S. Pat. No. 5,541,767 on Jul. 30, 1996.

FIELD OF INVENTION

This invention relates generally to visual aids and more particularly to an optical spectacle device having a pivotally attached telescope assembly which includes an indexing mechanism that repeatedly places the assembly in an operative position when pivoted from a non-operative position.

BACKGROUND OF THE INVENTION

Many people are employed in occupations that involve precision work performed at an arms-length distance. Examples of such people are surgeons, dentists, and machinists. Precision work is much more desirably performed if the work area can be significantly magnified as this reduces eye fatigue, improves working posture and increases the accuracy of the job. Moreover, there are people with serious vision deficiencies who must use vision aids in order to view objects that are either close-up or remotely located.

Accordingly, a multitude of prior art devices have been developed which provide magnification of distantly located objects. Many of these devices combine a set of spectacles with a pair of telescopes. In some of these devices, each telescope is attached directly to its respective lens of the spectacles. One such device can be seen by referring to U.S. Pat. No. 4,929,075 entitled OPTICAL VIEWING SYSTEM issued to Eliakim on May 29, 1990.

Other prior art devices have telescopic lens assemblies that are pivotally attached to the spectacle frame. An example of such a device is disclosed in U.S. Design Pat. No. 296,337 entitled DENTAL BINOCULARS issued to Caplan on Jun. 21, 1988. In this patent, a pair of telescopes are supported in a frame that is pivotally connected to a spectacle frame by some type of hinge arrangement. When the user wishes to view an object through the telescopes, the user flips the telescopes down in front of the lenses. When the user wishes to view conventionally through the spectacles, the telescopes are flipped up and away from the lenses.

A problem associated with devices employing pivoting telescopic lens assemblies is that every time the telescopes are flipped-down into position, the user must refocus each of the telescopes. This is because these prior art devices have no way of accurately placing the telescopic lens assembly in the same position every time the lenses are flipped down.

This can be quite an inconvenience especially if the user happens to be a surgeon or dentist. In this situation, the surgeon or dentist must take his attention off the procedure being performed and refocus the telescopes or try to pivot the telescopes back into the same position as before. This is especially inconvenient, in procedures where the surgeon or dentist is repeatedly flipping the telescope assembly up and down to look between the work area and the equipment and/or nurses.

Another problem associated with pivoting telescope assemblies relates to the difficulty users encounter when trying to look around the telescope assembly when it is flipped down in the operative position. In particular, the support frames that are used to mount the telescopes in prior art designs, tend to obstruct a portion of the spectacle lenses. Moreover, the prior art support frames centrally position the telescopes in front of the spectacle lenses when the telescopic lens assembly is in the flipped-down, operative position. Thus, if the user wishes to look conventionally through the spectacles, the user must flip up the spectacles to the non-operative position.

Thus, it is a primary object of the present invention to provide an improved optical spectacle device that employs a pivoting telescopic lens assembly that can be repeatedly flipped down into precisely the same operative position thereby eliminating the need to refocus each of the telescopes.

It is a further object of the present invention to provide an optical spectacle device which allows a user to look over the telescopic lens assembly when it is flipped down in the operative position.

SUMMARY OF THE INVENTION

An optical spectacle device comprising a spectacle frame having a pair of optical lenses. The spectacle device further includes a telescopic lens assembly pivotally attached to the spectacle frame which is pivotable between an operative position and a non-operative position. The spectacle device also includes indexing means for repeatedly orienting the telescopic lens assembly into the operative position from the non-operative position.

Also according the present invention are support means for holding the telescopes of the telescopic lens assembly. The support means are adapted to be substantially out of a user's forward line of sight when the telescopic lens assembly is flipped-down in the operative position.

BRIEF DESCRIPTION OF THE DRAWINGS

The present invention will be better understood upon the reading the foregoing Detailed Description in conjunction with the drawings wherein.

DETAILED DESCRIPTION OF THE INVENTION

Figure 1:
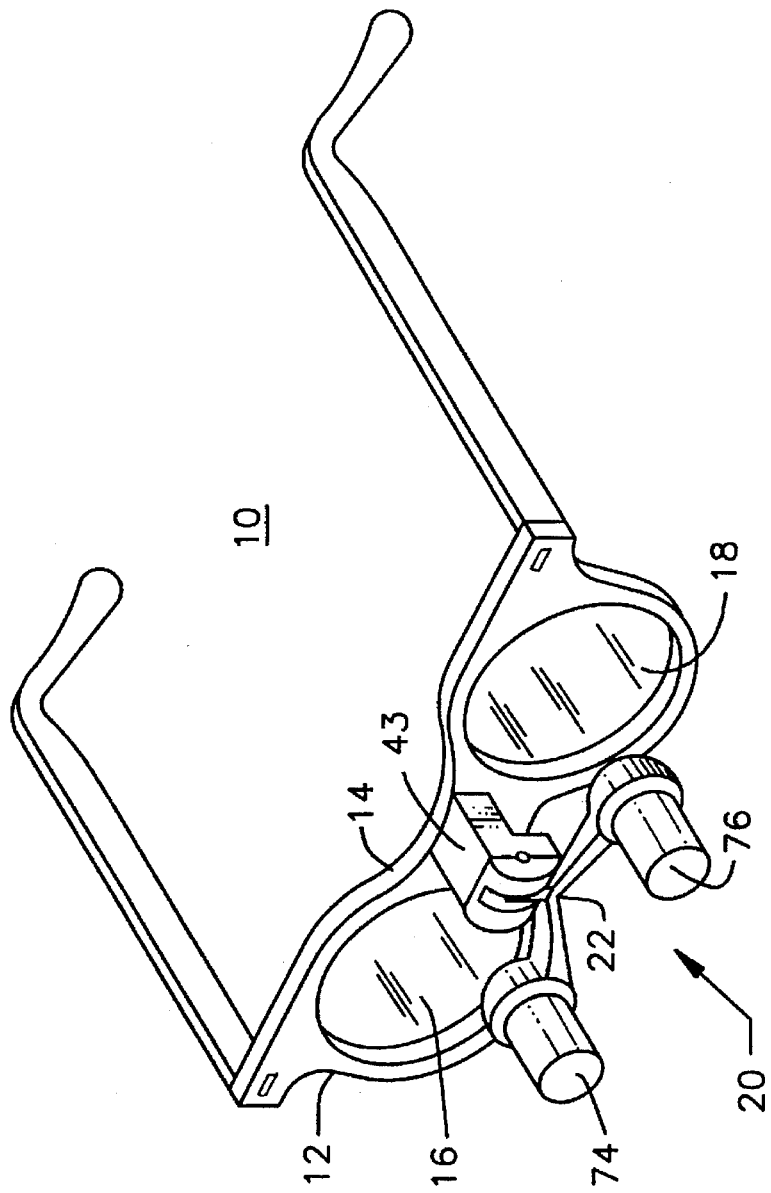
FIG. 1 is a perspective view of an exemplary embodiment of the optical spectacle device of the present invention.

Referring to FIG. 1, there is shown an exemplary preferred embodiment of the optical spectacle device according to the present invention designated by the numeral 10. The spectacle device 10 generally comprises a conventional spectacle frame 12 having a hinge assembly 43 attached to the bridge 14 of the spectacle frame 12. The hinge assembly 43 operates to pivotally couple a flip-up telescopic lens assembly 20 which includes a pair of telescopes 74 and 76, to the spectacle frame 12. The telescopes 74 and 76 preferably comprise a pair of well known Galilean telescopes.

The spectacle frame 12 includes a pair of optical lenses 16 and 18 which are indicative of a lens for the left eye and a lens for the right eye respectively. The optical lenses 16 and 18 are mounted in the spectacle frame 12 and are preferably constructed from glass or plastic, these materials being commonly used in making lenses for spectacles. Further, the optical lenses can include a user's vision corrections or be of the non-corrective type for user's with normal vision.

Figure 2A:
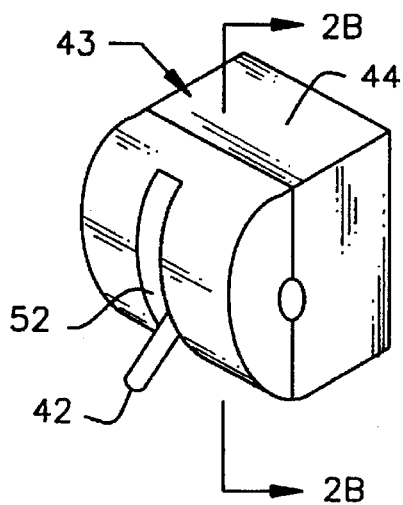
FIG. 2A is perspective view of the hinge assembly shown in FIG. 1.

In FIG. 2A, a front perspective view of the preferred hinge assembly 43 is shown separate from the spectacle frame 12 and the flip-up telescopic lens assembly 20. The hinge assembly 43 comprises a hinge housing 44 which is preferably manufactured as two components for ease of manufacturing and assembly. The hinge housing can be manufactured from any suitable material such as metal or plastic. Any well known screw or other like fastener or attaching method (not shown) can be used to retain the two components together and attach the hinge housing 44 to the bridge 14 of the spectacle frame 12.

A slot 52 is defined in the exterior surface of the hinge housing 44. Extending through the slot 52 of the hinge housing 44 is a coupling rod 42 which couples the telescopic lens assembly 20 to an internal component of the hinge assembly 43, to be described later. The slot 52 allows the coupling rod 42 to transverse the hinge housing 44 when the telescopic lens assembly 20 is flipped up or down.

Figure 2C:
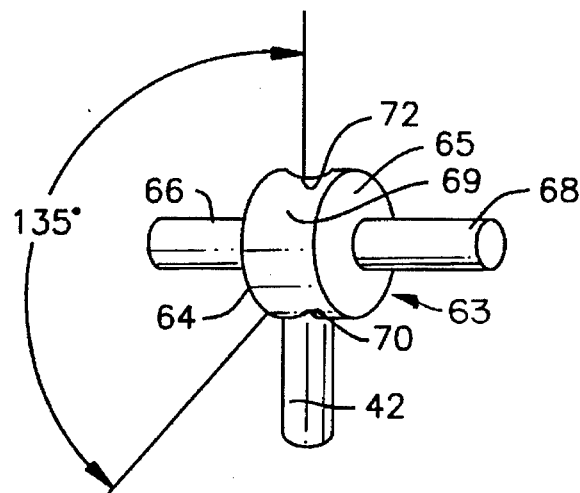
FIG. 2C is a perspective view of the rotating drum of the hinge assembly.
Figure 2B:
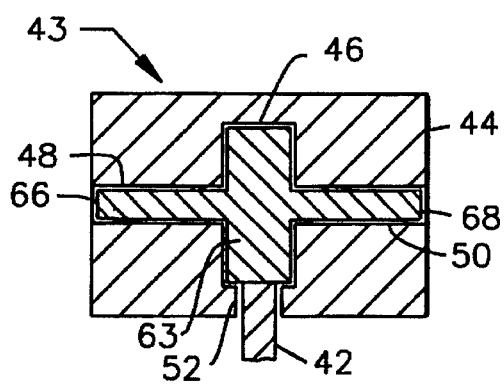
FIG. 2B is a cross sectional view through line 2B—2B of the hinge assembly of FIG. 2A.
Figure 2D:
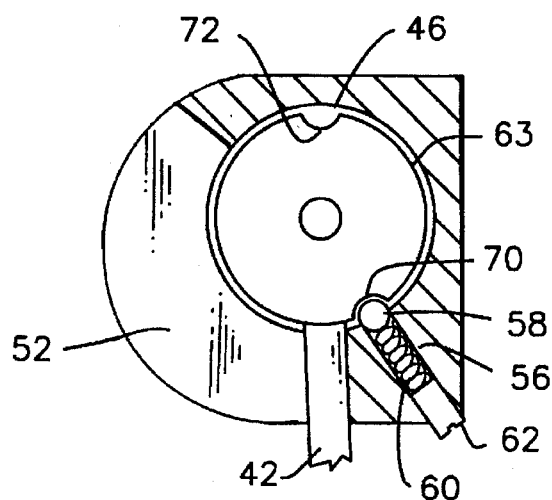
FIG. 2D is partial side cross-sectional view of the hinge assembly.

The internal components of the hinge assembly are best seen in FIGS. 2B–2D. As shown in FIGS. 2B and 2D, the slot 52 communicates with a drum receiving cavity 46 defined within the hinge housing 44. Also defined in hinge housing 44 is a first axle receiving bore 48 and a second axle receiving bore 50. Each axle receiving bore opens into the drum receiving cavity 46.

Suspended within the drum receiving cavity 46 is a rotating drum 63. The rotating drum 63 is shown separate from the cavity in FIG. 2C. As can be seen in FIG. 2C, the rotating drum 63 defines a circumferential surface 69 which extends between opposing first and second respective drum end faces 64 and 65. Projecting in a first direction away from the first drum end face 64 is a first drum axle 66. A second drum axle 68 projects from the second drum end face 65 in a direction which is opposite to the first direction. The circumferential surface 69 defines a first indentation or dimple 70 and a second indentation or dimple 72. These indentations are circumferentially spaced from each other approximately 135° on the circumferential surface 69. The coupling rod 42 extends radially away from the circumferential surface 69 at a location adjacent to the second indentation 72.

By referring again to FIG. 2B, one can see how the rotating drum 63 is suspended in the drum receiving cavity 46 of the hinge housing 44. As can be seen, the first and second drum axles ride in the first and second axle receiving bores of the hinge housing to rotate the drum 63 within the drum receiving cavity 46.

The hinge assembly 43 further includes an indexing mechanism for repeatedly and precisely orienting the telescopic lens assembly in the operative down position and the non-operative up position. A preferred exemplary embodiment of the indexing mechanism is shown in the partial cross-sectional side view of FIG. 2D. It should be understood, however, that any other indexing arrangement which operates to repeatedly and precisely orient the telescopic lens assembly in the operative down position and the non-operative up position, can be used.

In any event, the indexing mechanism shown therein in FIG. 2D comprises the first and second indentations on the circumferential surface 69 of the rotating drum 63. The other components of the indexing mechanism comprise a ball 58, a spring 60 and a set screw 62. The ball 58, spring 60 and set screw 62 are received in a threaded aperture 56 formed in the hinge housing 44. The threaded aperture 56 communicates with the drum receiving cavity 46 to enable the ball 58 to make contact with the circumferential surface 69 of the rotating drum 63. The spring 60 biases the ball 58 against the circumferential surface of the rotating drum 63 as the drum is rotated within the drum receiving cavity. When the ball passes over one of the two indentations on the rotating drum 63, the spring 60 biases the ball into that indentation to provide indexing at that particular rotational position. The drum remains locked in that particular position until a substantial rotational torque is applied to the rotating drum assembly 63 to move the ball out of the indentation.

The set screw 62 operates to hold the spring 60 and the ball 58 within the threaded aperture 56. The set screw 62 further operates to allow the spring bias, applied by spring 60, to be adjusted to either increase or decrease the torque required to rotate the drum 63 out of the indexed position. An increase in spring bias can be accomplished by threading the set screw 58 deeper into the threaded aperture 56 to decrease the length of the spring 60. To decrease the spring bias, the set screw 58 is threaded less deeply into the threaded aperture 56 to increase the length of the spring 60.

Figure 3A:
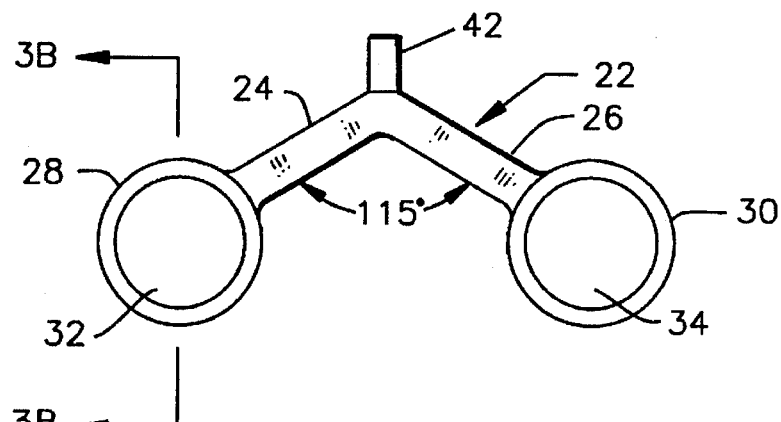
FIG. 3A is front elevational view of the support frame.
Figure 3B:
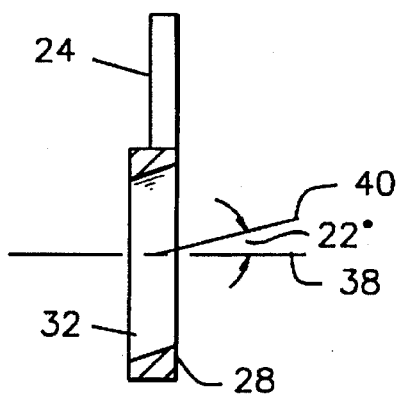
FIG. 3B is side cross-sectional view through line 3B—3B of FIG. 3A.

FIG. 3A shows a front elevational view of the support frame 22 of the flip-up telescopic lens assembly 20 separated from the spectacle frame 12 and the hinge assembly 43. The support frame 22 of the flip-up telescopic lens assembly 20 can be made from any suitable material such as metal or plastic. The support frame 22 comprises a Y-shaped member having first and second support arms 24 and 26 respectively which extend laterally in opposite directions from the vertically extending coupling rod 42. The coupling rod 42 attaches the flip-up telescopic lens assembly 20 to the rotating drum 63 of the hinge assembly 43. As can be seen, the first and second support arms are angularly separated by approximately 115°.

Each of the support arms includes a collar for mounting each of the telescopes 74 and 76. In particular, the first support arm 24 includes a first telescope receiving collar 28, which defines a first aperture 32 for mounting the first telescope 74. Similarly, the second support arm 26 includes a second telescope receiving collar 30, which defines a second aperture 34 for mounting the second telescope 76.

The support frame 22 places the telescopes 74 and 76 substantially in front of the lower portions of their respective lenses of the spectacle frame 12 when the flip-up telescopic lens assembly is flipped down into the operative position. Further, as shown by example in the cross-sectional view through the first telescope receiving collar in FIG. 3D, each of the first and second telescopes are angled downwardly when mounted in their respective receiving collar aperture. As can be seen in FIG. 3D, the aperture 32 defines a telescope mounting axis 40 which extends at approximately a 22° angle measured relative to the reference axis 38. This construction enables a user to easily look over the flip-up telescopes when the telescopes are flipped down in the operative position. Moreover, this angle enables a user to merely look down through the lower portion of the spectacle frame lenses without head tilting or changing posture, when an object is viewed through the telescopes.

Figure 3C:
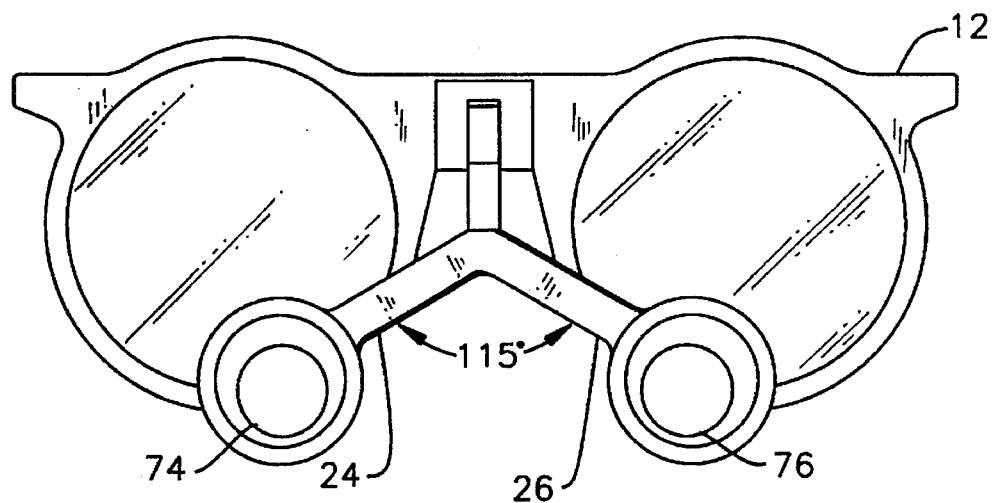
FIG. 3C is a front elevational view of the optical spectacle device of FIG. 1.

As can be seen in FIG. 3C, obstruction through the lenses is also substantially reduced by the 115° angular separation between the first and second support arms 24 and 26. This configuration orients the support arms substantially away from the front portions of each respective spectacle lens.

Figure 4A:
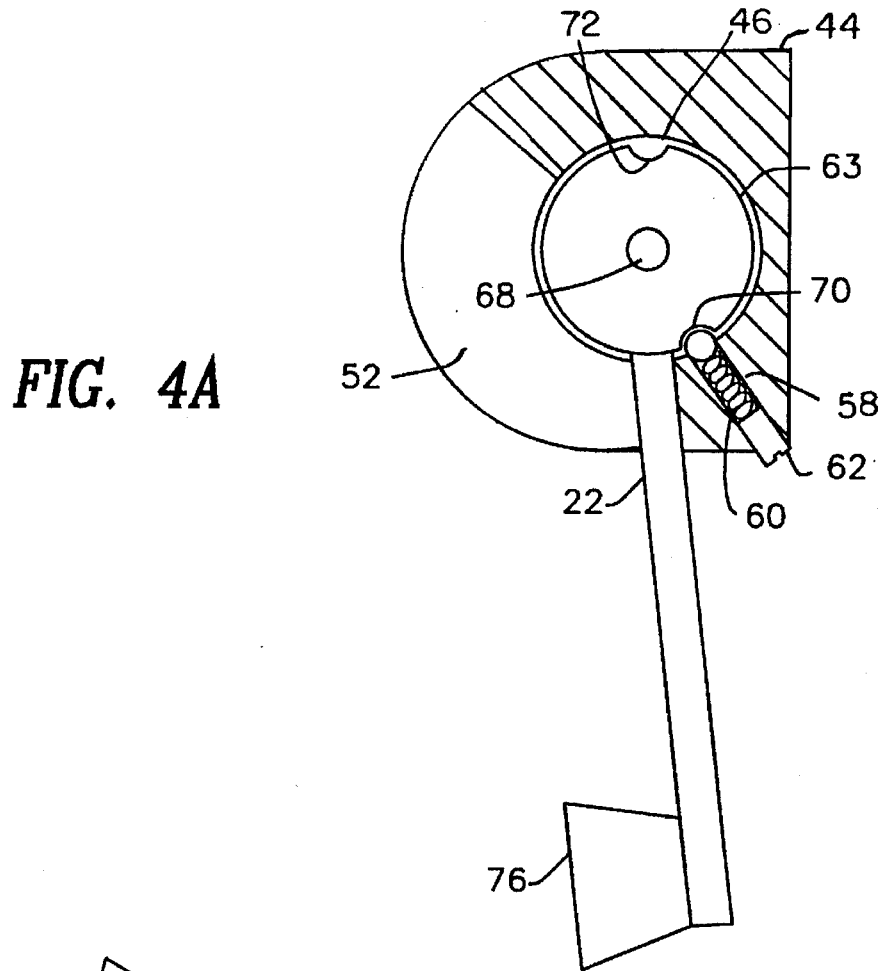
FIG. 4A is partial side cross-sectional view of the flip-up telescopic lens assembly shown in FIG. 1 in the flipped-down position, operative position.

The operation of the flip-up telescopic lens assembly will now be described with reference to FIGS. 4A and 4B. In FIG. 4A, the flip-up telescopic lens assembly is shown indexed in the flipped-down or operative position. In the operative position, a user can view an object through the telescopes by glancing down through the lower portions of the spectacle frame lenses. Indexing in this position occurs when the ball 70 is positioned within the first indentation 70 in the circumferential surface 69. Note that in the operative position, the second indentation 72 on the rotating drum is located at approximately the 12 o'clock position. The indexing mechanism ensures that the telescopes can be repeatedly flipped down into precisely the same position every time thereby eliminating the need to refocus each of the telescopes.

Figure 4B:
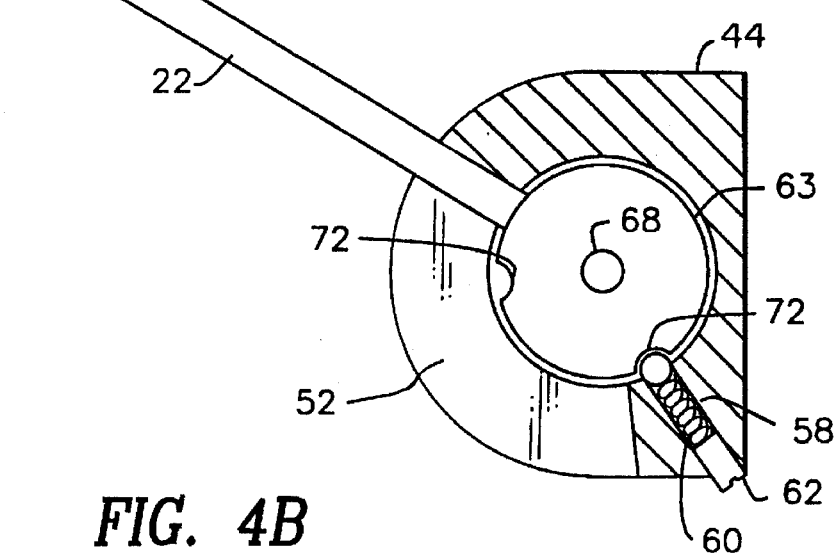
FIG. 4B is partial side cross-sectional view of the flip-up telescopic lens assembly shown in FIG. 1 in the flipped-up, non-operative position.

In FIG. 4B, the flip-up telescopic lens assembly has been flipped up into the non-operative position. In this position, the ball 58 of the indexing mechanism is engaged with the second indentation 72, and operates to hold the flip-up telescopic lens assembly in the flipped-up or non-operative position.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

I claim:

1. An optical spectacle device comprising:

a spectacle frame having a pair of optical lenses;

a telescope lens assembly pivotally attached to said spectacle frame, said telescope lens assembly being pivotable between a predetermined operative position and a predetermined non-operative position; and indexing means for repeatedly and automatically locking said telescoping lens assembly in said predetermined operative position and said predetermined non-operative position.

2. The optical spectacle device of claim 1, wherein said telescopic lens assembly includes at least one telescope and support means for holding said at least one telescope.

3. The optical spectacle device of claim 2, wherein said at least one telescope comprises a pair of telescopes.

4. The optical spectacle device of claim 2, wherein said support means is substantially out of a user's forward line of sight when said telescopic lens assembly is in said operative position.

5. The optical spectacle device of claim 4, wherein said pivotal attachment of said telescopic lens assembly to said spectacle frame includes said support means pivotally attached to hinge means mounted on said spectacle frame.

6. The optical spectacle device of claim 5, wherein said indexing means is associated with said hinge means.

7. The optical spectacle device of claim 1, wherein at least one of said pair of optical lenses comprises a corrective optical lens.

8. An optical spectacle device comprising:

a spectacle frame having a pair of optical lenses;

a telescope lens assembly having at least one telescope, pivotally attached to said spectacle frame, said telescope lens assembly being repeatable pivotable between a predetermined non-operative position and a predetermined operative position without refocusing of said at least one telescope;

support means for holding said at least one telescope, said support means being substantially out of a user's forward line of sight when said telescope lens assembly is in said operative position, said support means being pivotally attached to hinge means mounted on said spectacle frame;

indexing means associated with said hinge means, said indexing means operating to repeatedly and automatically lock said telescope lens assembly in said predetermined operative position and said predetermined non-operative position.

9. The optical spectacle device of claim 8, wherein said at least one telescope comprises a pair of telescopes.

10. The optical spectacle device of claim 8, wherein said pivotal attachment of said telescopic lens assembly to said spectacle frame includes said support means pivotally attached to hinge means mounted on said spectacle frame.

11. The optical spectacle device of claim 8, wherein at least one of said pair of optical lenses comprises a corrective optical lens.

12. A telescope lens assembly for an optical spectacle device, comprising:

hinge means for pivotally mounting said telescope lens assembly to the optical spectacle device;

support means for holding at least one telescope, said support means being pivotally attached to said hinge means wherein said support means is capable of pivoting between a predetermined operative position and a predetermined non-operative position; and indexing means associated with said hinge means for repeatedly and automatically locking said telescope lens assembly in said predetermined operative position and said predetermined non-operative position.

13. The telescopic lens assembly according to claim 12, wherein said hinge means includes hinge housing means.

14. The telescopic lenses assembly according to claim 13, wherein said hinge means further includes rotating means disposed with in said housing, said rotating means being coupled to said support means.

15. The telescopic lens assembly according to claim 14, wherein said indexing means is associated with said rotating means.

16. The telescopic lens assembly according to claim 12, wherein said support means comprises a Y-shaped support frame.

17. The telescopic lens assembly according to claim 12, wherein said at least one telescope comprises a pair of telescopes.

18. The telescopic lens assembly according to claim 12, wherein said at least one telescope comprises a Galilean telescope.

* * * * *